(12) United States Patent
Lei et al.

(10) Patent No.: US 11,108,300 B2
(45) Date of Patent: Aug. 31, 2021

(54) QUICK ASSEMBLY STRUCTURE USED FOR DRIVER

(71) Applicant: OKIN Refined Electric Technology Co., Ltd, Jiaxing (CN)

(72) Inventors: Minglong Lei, Jiaxing (CN); Long Li, Jiaxing (CN); Chenjian Lei, Jiaxing (CN)

(73) Assignee: DewertOkin Technology Group Co., Ltd.

( * ) Notice: Subject to any disclaimer, the term of this patent is extended or adjusted under 35 U.S.C. 154(b) by 203 days.

(21) Appl. No.: 16/382,156

(22) Filed: Apr. 11, 2019

(65) Prior Publication Data
US 2019/0372423 A1  Dec. 5, 2019

(30) Foreign Application Priority Data

May 29, 2018 (CN) .......................... 201820813650.1
Nov. 16, 2018 (CN) .......................... 201821890605.2

(51) Int. Cl.
*H02K 5/22*   (2006.01)
*H02K 5/04*   (2006.01)
*H02K 41/02*  (2006.01)
*H02N 2/00*   (2006.01)
*H02N 2/06*   (2006.01)

(52) U.S. Cl.
CPC ............... *H02K 5/225* (2013.01); *H02K 5/04* (2013.01); *H02K 41/02* (2013.01); *H02N 2/001* (2013.01); *H02N 2/0055* (2013.01); *H02N 2/06* (2013.01)

(58) Field of Classification Search
CPC ....... H02K 5/20; H02K 33/18; H02K 41/0356
USPC ................................ 310/12.33, 89, 402, 418
See application file for complete search history.

(56) References Cited

U.S. PATENT DOCUMENTS

2004/0245872 A1* 12/2004 Eppler ..................... H02K 5/08
                                                           310/89
2018/0320413 A1* 11/2018 Wong ................... E05B 53/008

* cited by examiner

*Primary Examiner* — Jose A Gonzalez Quinones

(57) ABSTRACT

A quick assembly structure used for a driver is provided. The driver comprises a motor, an upper shell and a lower shell, and the upper shell is combined with the lower shell. The quick assembly structure comprises a clamping cavity formed in the lower shell. The upper shell is provided with a clamping piece to be inlaid in the clamping cavity. One end of the clamping piece is fixedly connected to the upper shell, and the other end of the clamping piece is an open end. A clamping hole is formed in a side of the lower shell, and the upper shell is provided with a first hook to be inlaid in the clamping hole.

10 Claims, 5 Drawing Sheets

QUICK ASSEMBLY STRUCTURE USED FOR DRIVER

CROSS REFERENCE TO THE RELATED APPLICATIONS

This application is based upon and claims priority to Chinese Patent Application No. 201820813650.1, filed on May 29, 2018, and Chinese Patent Application No. 201821890605.2, filed on Nov. 16, 2018, the entire contents of which are incorporated herein by reference.

TECHNICAL FIELD

The invention relates to a quick assembly structure used for a driver.

BACKGROUND

Motors of existing linear drivers are generally perpendicular to the power output direction of the linear drivers. In the prior art, when motors and shells are assembled, screw holes of the motors and the shells are aligned first, and then the motors and the shells are tightened and fixed together with screws. Due to the fact that multiple screws need to be tightened to assemble the motors and the shells, the assembly efficiency is low, and the manufacturing cost is high.

SUMMARY

The objective of the invention is to provide a quick assembly structure used for a driver. The quick assembly structure used for the driver is simple and reasonable in design and high in assembly efficiency.

The technical scheme adopted by the invention is to provide a quick assembly structure used for a driver. The driver comprises a motor, an upper shell and a lower shell. The upper shell is combined with the lower shell. The quick assembly structure comprises a clamping cavity formed in the lower shell. The upper shell is provided with a clamping piece to be inlaid in the clamping cavity. One end of the clamping piece is fixedly connected with the upper shell, and the other end of the clamping piece is an open end. A clamping hole is formed in the other side of the lower shell. The upper shell is provided with a first hook to be inlaid in the clamping hole.

Wherein, an inner arc face and an outer arc face are arranged in the clamping cavity, and the clamping piece is provided with an upper arc face corresponding to the inner arc face and a lower arc face corresponding to the outer arc face; and after the clamping piece is inlaid in the clamping cavity, the upper arc face makes contact with the inner arc face, the lower arc face makes contact with the outer arc face, the upper shell swings relative to the lower shell until the first hook on the other side of the lower shell is inlaid in the clamping hole, and then the first hook is clamped and fixed in the clamping hole.

Wherein, a first stop edge is arranged outside an opening of the clamping cavity, a second stop edge is arranged at a junction of the upper shell and one end of the clamping piece, and when the upper shell is combined with the lower shell, the first stop edge makes contact with the second stop edge.

Wherein, the inner arc face of the clamping cavity and the upper arc face of the clamping piece are concentric arcs having different radiuses.

Wherein, the first stop edge is an outer circular face, and the second stop edge is an inner circular face.

Wherein, the outer circular face and the inner circular face are concentric circles.

Wherein, the upper shell is further provided with a second hook, and the lower shell is provided with a hook strip to be firmly hooked by the second hook.

Wherein, an upper end face of the hook strip is a downward slope or an arc face, and a lower end face of the hook strip is a horizontal face or a slope opposite to the hook.

Compared with the prior art, the invention has the following advantages and effects: when the lower shell and a motor housing are assembled, the flange of the motor housing falls onto the convex edge of the lower shell to be limited, and screws can be conveniently and quickly tightened after the flange is limited; and in addition, the motor and the lower shell are fastened with the screws and are also structurally clamped and positioned, so that the overall assembly structure is stable and reliable.

DETAILED DESCRIPTION OF THE EMBODIMENTS

The invention is further expounded below with reference to the accompanying drawings and embodiments. The following embodiments are used to explain the invention, but are not intended to limit the invention.

Embodiment 1

Figure 1:
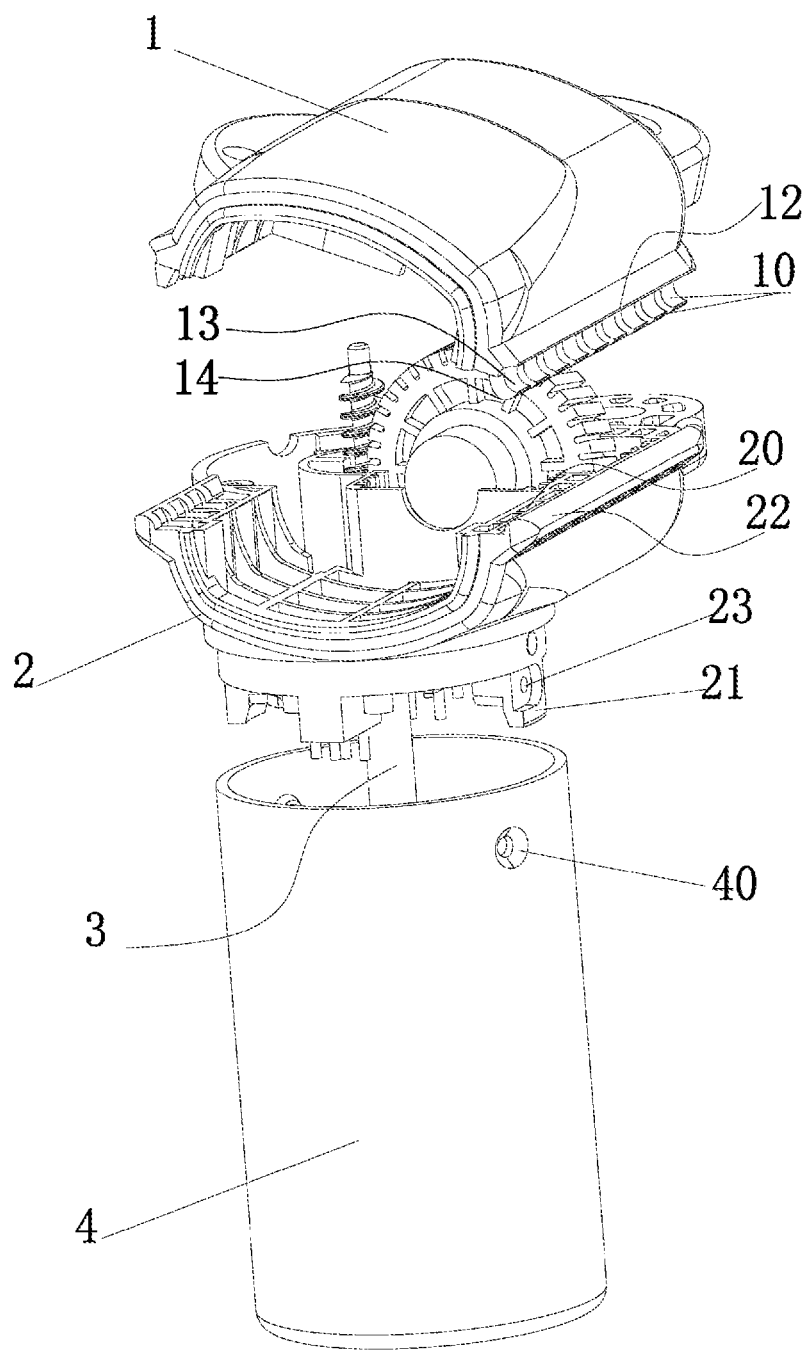
FIG. 1 is an exploded view of the invention.
Figure 2:
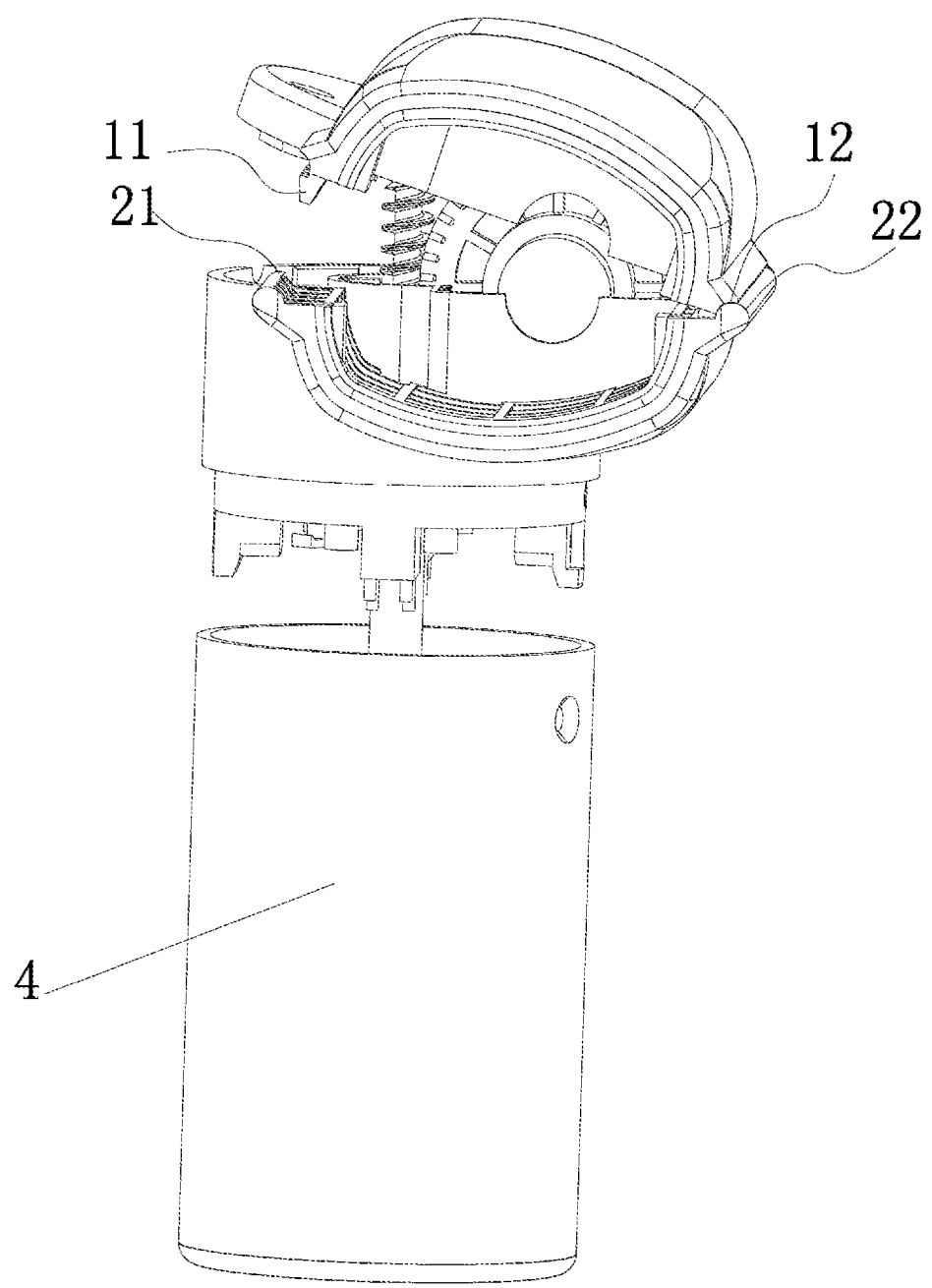
FIG. 2 is a structural view of the invention when a clamping piece is inlaid in a clamping cavity.
Figure 3:
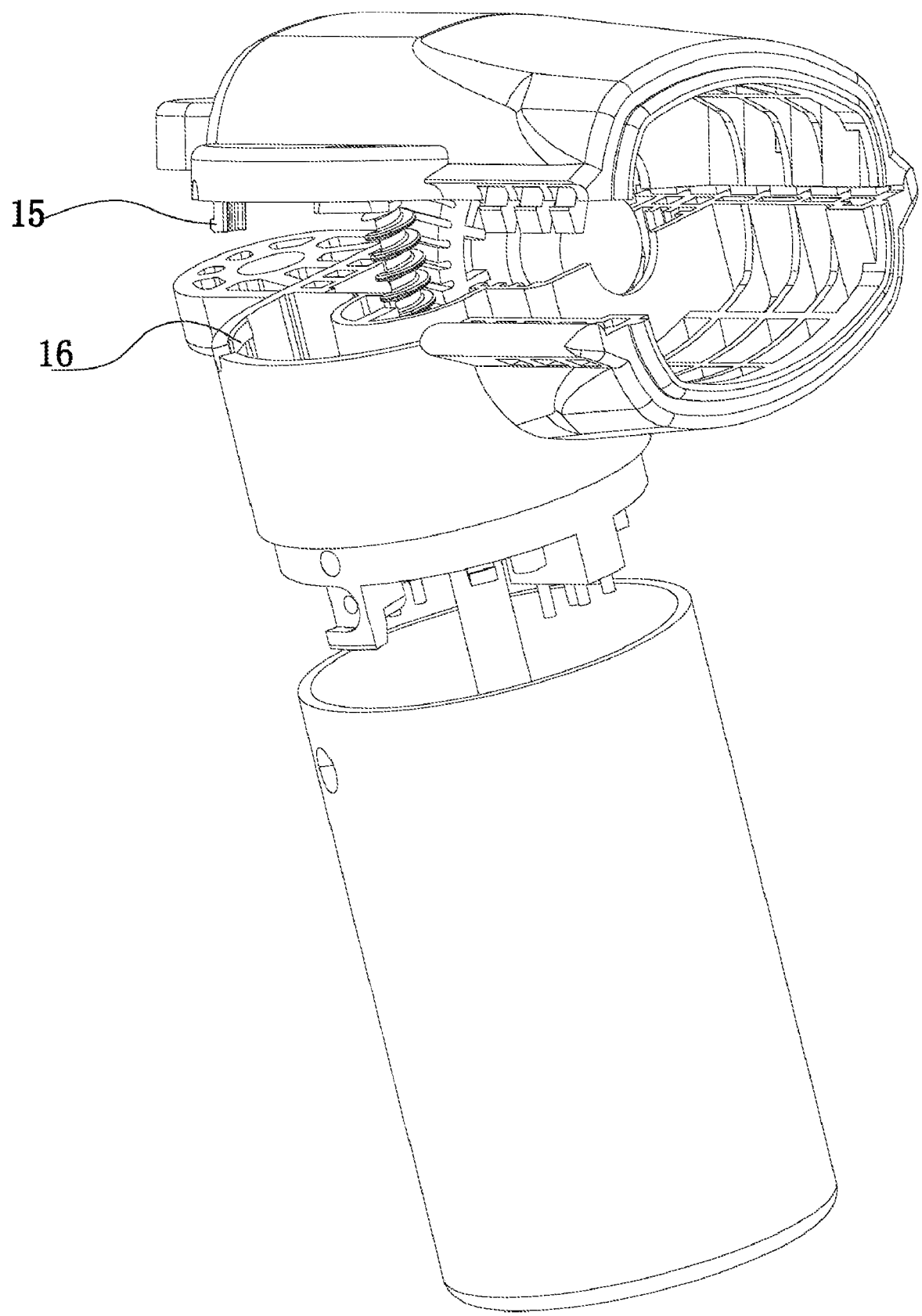
FIG. 3 is another structural view of FIG. 2.
Figure 4:
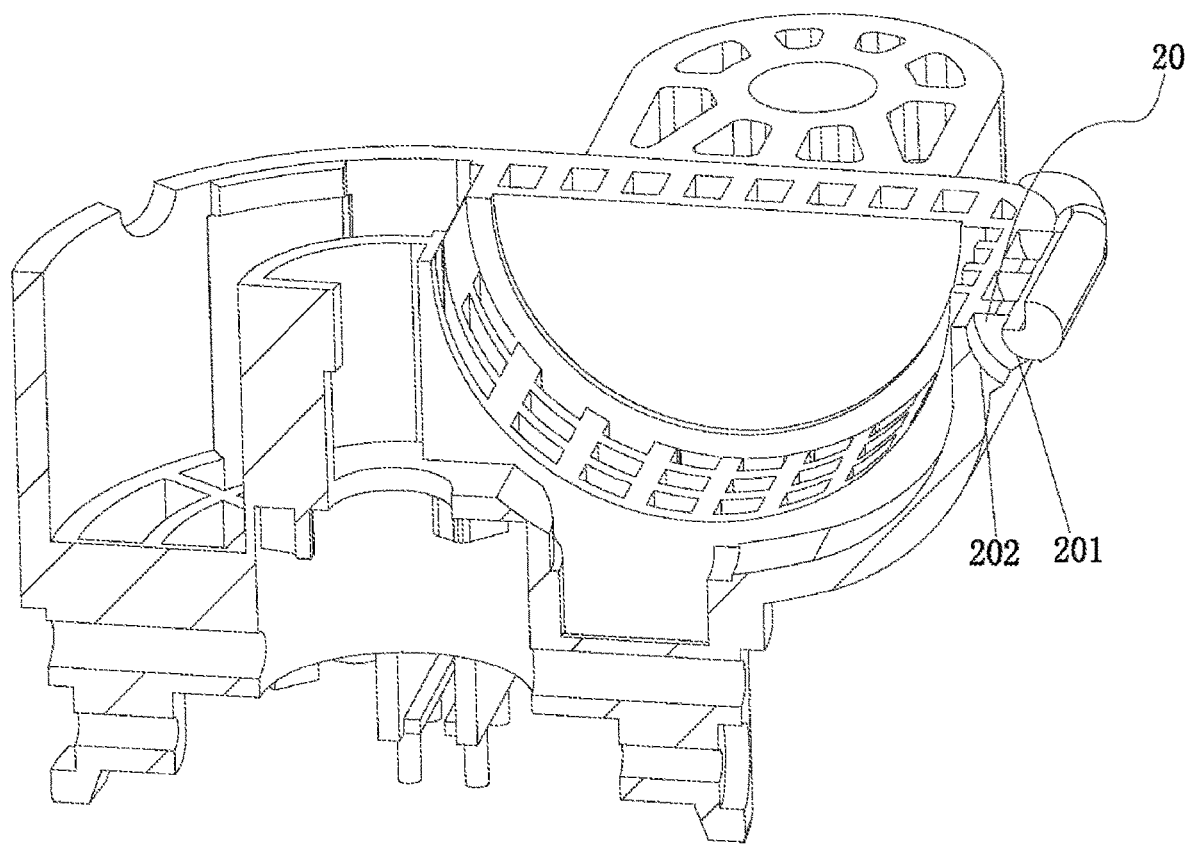
FIG. 4 is a sectional view of a lower shell of the invention.
Figure 5:
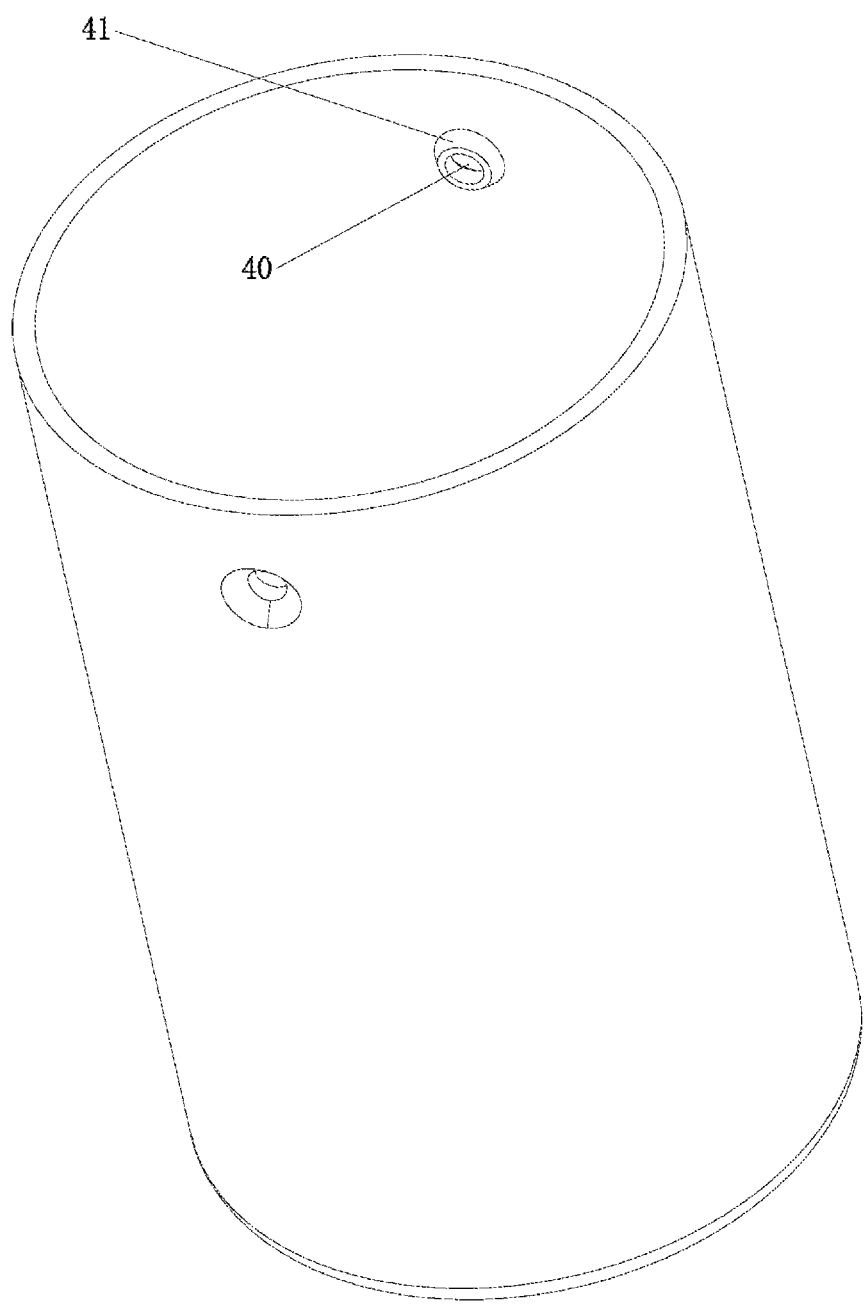
FIG. 5 is a structural view of a motor housing of the invention.

As shown in FIGS. 1-5, the invention provides a quick assembly structure used for a driver. The driver comprises a motor, an upper shell 1 and a lower shell 2. The upper shell 1 is combined with the lower shell 2. The motor comprises a rotor 3 and a motor housing 4. The lower shell 2 is provided with a radial mounting hole 23. A convex edge 21 half surrounding the mounting hole 23 is arranged outside the mounting hole 23. A through hole 40 is formed in a side wall of the motor housing 4. A flange 41 surrounding the through hole 40 is arranged on an inner side of the side wall of the motor housing 4. The convex edge 21 is provided with an opening allowing the flange 41 to enter or come out of the lower shell 2. Preferably, the convex edge 21 is in a U shape, and the flange 41 has an outer diameter slightly smaller than an internal space of the U-shaped convex edge 21. When the motor housing 4 and the lower shell 2 are combined and assembled, the flange 41 enters the lower shell 2 via the opening and is then limited by the convex edge 21, and a fastener penetrates through the through hole 40 and the mounting hole 23 to fixedly connect the lower shell 2 and the motor housing 4 together. When the structure is assembled, the lower shell 2 draws close to the motor housing 4 first, then the lower shell 2 or the motor housing 4 is rotated to make the flange 41 fall onto the convex edge 21 to be limited, screws can be conveniently and quickly tightened after the flange 41 is limited, and the motor and the lower shell 2 are fastened with the screws and are also structurally clamped and positioned, so that the overall assembly structure is stable and reliable.

In this embodiment, the quick assembly structure comprises a clamping cavity 20 formed in one side of the lower shell 2. The upper shell 1 is provided with a clamping piece 10 to be inlaid in the clamping cavity 20. One end of the clamping piece 10 is fixedly connected with the upper shell 1, and the other end of the clamping piece 10 is an open end. A clamping hole 21 is formed in the other side of the lower shell 2. The upper shell 1 is provided with a first hook 11 to be inlaid in the clamping hole 21. The clamping piece 10 is inserted into the clamping cavity 20 and is limited by the clamping cavity 20 after being inlaid in the clamping cavity 20, the clamping hole 21 is formed in the other side of the lower shell 2, the first hook 11 arranged on the upper shell 1 is firmly clamped in the clamping hole 21 after being inlaid in the clamping hole 21, the clamping piece 10 is then inlaid in the clamping cavity 20, and finally, the upper shell 1 and the lower shell 2 are fixedly assembled.

In this embodiment, an inner arc face 201 and an outer arc face 202 are arranged in the clamping cavity 20, and the clamping piece 10 is provided with an upper arc face 13 corresponding to the inner arc face 201 and a lower arc face 14 corresponding to the outer arc face 202. After the clamping piece 10 is inlaid in the clamping cavity 20, the upper arc face 13 makes contact with the inner arc face 201, the lower arc face 14 makes contact with the outer arc face 202, the upper shell 1 swings relative to the lower shell 2 until the first hook 11 on the other side of the lower shell 2 is inlaid in the clamping hole 21, and then the first hook 11 is clamped and fixed in the clamping hole 21. When the upper shell 1 is combined with the lower shell 2, the clamping piece 10 is inlaid in the clamping cavity 20 first, and then the first hook 11 draws close to the clamping hole 21. In this scheme, the joint of the clamping piece 10 and the clamping cavity 20 is a rotation point, the clamping cavity and the clamping piece can be attached in a face-to-face manner after rotation through the arc faces, and thus, the assembly precision is improved.

Preferably, the inner arc face 201 of the clamping cavity and the upper arc face 13 of the clamping piece are concentric arcs having different radiuses, so that when the upper shell 1 rotates relative to the lower shell 2, the upper arc face 13 rotates close to the inner arc face 201, and thus, smooth assembly and high assembly precision are realized.

In this embodiment, a first stop edge 22 is arranged outside an opening of the clamping cavity 20, and a second stop edge 12 is arranged at a junction of the upper shell 1 and one end of the clamping piece 10. When the upper shell 1 is combined with the lower shell 2, the first stop edge 22 makes contact with the second stop edge 12. After the first stop edge 22 and the second stop edge 12 are in contact, the upper shell 1 and the lower shell 2 are horizontally limited.

Preferably, the first stop edge 22 is an outer circular face, and the second stop edge 12 is an inner circular face. The outer circular face and the inner circular face rotate close to each other, so that assembly is more convenient. The outer circular face and the inner circular face are concentric circles.

In this embodiment, the upper shell 1 is further provided with a second hook 15, and the lower shell 2 is provided with a hook strip 16 to be firmly hooked by the second hook 15. The hook strip 16 protrudes out of the lower shell 2, the second hook 15 is squeezed by the hook strip 16 to deform to surmount the side face of the hook strip 16 and then rebounds to abut against a lower end face of the hook strip 16, and thus, the lower shell 2 is firmly hooked by the second hook 15.

In this embodiment, an upper end face of the hook strip 16 is a downward slope or an arc face. In this embodiment, the downward slope inclines downwards towards the inner side of the lower shell 2 from the upper side of the upper shell 2, and the lower end face of the hook strip 16 is a horizontal face or a slope opposite to the hook. The slope is opposite to the hook means that the slope and the hook are opposite to each other in the positioning direction. Particularly, the second hook 15 is √-shaped, and the slope of the lower end face inclines downwards towards the inner side of the lower shell from the upper side of the lower shell 2 and is then inlaid in the second hook 15.

The above embodiments in the specification are only illustrative ones of the invention. Various modifications, supplements or similar substitutes of these specific embodiments made by those skilled in this field without deviating from the contents in the specification or going beyond the scope defined by the claims should also fall within the protection scope of the invention.

What is claimed is:

1. A quick assembly structure used for a driver, wherein the driver comprises a motor, an upper shell and a lower shell, and the upper shell is combined with the lower shell;
    the quick assembly structure comprises a clamping cavity formed in the lower shell, the upper shell is provided with a clamping piece to be inlaid in the clamping cavity, the clamping piece comprises a first end and a second end, the first end is fixedly connected to the upper shell, and the second end is a free end; and
    a clamping hole is formed in a first side of the lower shell, and the upper shell is provided with a first hook to be inlaid in the clamping hole;
    wherein an inner arc face and an outer arc face are arranged in the clamping cavity, the clamping piece is provided with an upper arc face and a lower arc face, the upper arc face corresponds to the inner arc face, and the lower arc face corresponds to the outer arc face; and
    after the clamping piece is inlaid in the clamping cavity, the upper arc face makes a contact with the inner arc face, the lower arc face makes a contact with the outer arc face, the upper shell swings relative to the lower shell until the first hook is inlaid in the clamping hole, and then the first hook is clamped and fixed in the clamping hole.

2. The quick assembly structure used for the driver according to claim 1, wherein a first stop edge is arranged outside an opening of the clamping cavity, a second stop edge is arranged at a junction of the upper shell and an end of the clamping piece, and when the upper shell is combined with the lower shell, the first stop edge makes a contact with the second stop edge.

3. The quick assembly structure used for the driver according to claim 1, wherein the inner arc face of the clamping cavity and the upper arc face of the clamping piece are concentric arcs having different radiuses.

4. The quick assembly structure used for the driver according to claim 2, wherein the first stop edge is an outer circular face, and the second stop edge is an inner circular face.

5. The quick assembly structure used for the driver according to claim 4, wherein the outer circular face and the inner circular face are concentric circles.

6. The quick assembly structure used for the driver according to claim 1, wherein the upper shell is further provided with a second hook, and the lower shell is provided with a hook strip to be firmly hooked by the second hook.

7. The quick assembly structure used for the driver according to claim 6, wherein an upper end face of a hook strip is a downward slope or an arc face, and a lower end face of the hook strip is a horizontal face or a slope opposite to the second hook.

8. The quick assembly structure used for the driver according to claim 1, wherein a first stop edge is arranged outside an opening of the clamping cavity, a second stop edge is arranged at a junction of the upper shell and an end of the clamping piece, and when the upper shell is combined with the lower shell, the first stop edge makes a contact with the second stop edge.

9. The quick assembly structure used for the driver according to claim 8, wherein the first stop edge is an outer circular face, and the second stop edge is an inner circular face.

10. The quick assembly structure used for the driver according to claim 9, wherein the outer circular face and the inner circular face are concentric circles.

\* \* \* \* \*